United States Patent
Mian et al.

(10) Patent No.: US 11,320,371 B2
(45) Date of Patent: May 3, 2022

(54) OPTICAL WHEEL EVALUATION

(71) Applicant: International Electronic Machines Corp., Troy, NY (US)

(72) Inventors: Zahid F. Mian, Loudonville, NY (US); Ronald W. Gamache, East Greenbush, NY (US)

(73) Assignee: International Electronic Machines Corp., Troy, NY (US)

( * ) Notice: Subject to any disclaimer, the term of this patent is extended or adjusted under 35 U.S.C. 154(b) by 0 days.

(21) Appl. No.: 16/647,170

(22) PCT Filed: Sep. 14, 2018

(86) PCT No.: PCT/US2018/051098
§ 371 (c)(1),
(2) Date: Mar. 13, 2020

(87) PCT Pub. No.: WO2019/055795
PCT Pub. Date: Mar. 21, 2019

(65) Prior Publication Data
US 2020/0408682 A1   Dec. 31, 2020

Related U.S. Application Data

(60) Provisional application No. 62/559,029, filed on Sep. 15, 2017.

(51) Int. Cl.
*G01N 21/47* (2006.01)
*G01B 11/30* (2006.01)
*G01N 21/952* (2006.01)

(52) U.S. Cl.
CPC ....... *G01N 21/4738* (2013.01); *G01B 11/303* (2013.01); *G01N 21/952* (2013.01)

(58) Field of Classification Search
CPC ......... B61K 9/10; B61K 9/12; G01M 17/013; G01M 17/08; G01M 17/027;
(Continued)

(56) References Cited

U.S. PATENT DOCUMENTS 3,829,192 A   8/1974   Wheeler
5,247,338 A   9/1993   Danneskiold-Samsoe et al.
(Continued)

FOREIGN PATENT DOCUMENTS

CN      1624419 A     6/2005
CN    101358839 A     2/2009
(Continued)

OTHER PUBLICATIONS

Lee, S. G., International Application No. PCT/US2018/051098, International Search Report and Written Opinion, dated Feb. 14, 2019, 15 pages.
(Continued)

*Primary Examiner* — Hoa Q Pham
(74) *Attorney, Agent, or Firm* — LaBatt, LLC

(57) ABSTRACT

Evaluation of a rotating wheel is described. The evaluation utilizes information acquired by radiation reflecting off of one or more regions of the rotating wheel. An imaging device can acquire image data which is processed to evaluate the wheel. The radiation can comprise diffuse and/or coherent radiation. Image data for substantially an entire circumference of the wheel can be used in the evaluation.

20 Claims, 10 Drawing Sheets

(58) Field of Classification Search
CPC ...... G01M 5/0033; G01B 11/10; G01B 11/25; G01B 11/24; G01B 2210/286; G01N 2291/2696; G01N 21/88; G01N 2033/0085
USPC ..... 356/237.1–237.5, 446, 601–635, 139.09; 250/559.2, 559.23, 559.24; 382/104; 73/146, 115.07, 593; 701/19
See application file for complete search history.

(56) References Cited

U.S. PATENT DOCUMENTS

| | | | |
|---|---|---|---|
| 5,368,260 | A | 11/1994 | Izbinsky et al. |
| 5,636,026 | A | 6/1997 | Mian et al. |
| 5,793,492 | A | 8/1998 | Vanaki |
| 6,768,551 | B2 | 7/2004 | Mian et al. |
| 7,564,569 | B2 | 7/2009 | Mian et al. |
| 8,335,606 | B2 | 12/2012 | Mian et al. |
| 8,925,873 | B2 | 1/2015 | Gamache et al. |
| 9,945,652 | B2 | 4/2018 | Mian et al. |
| 10,435,052 | B2 | 10/2019 | Mesher |
| 10,723,373 | B2 | 7/2020 | Mesher |
| 10,866,195 | B2 * | 12/2020 | Iher ........................ G01N 21/95 |
| 2003/0072001 | A1 * | 4/2003 | Mian ...................... G01B 11/25 356/446 |
| 2005/0052637 | A1 | 3/2005 | Shaw et al. |
| 2005/0052658 | A1 | 3/2005 | Braghiroli |
| 2006/0232787 | A1 | 10/2006 | Hoffmann et al. |
| 2006/0244907 | A1 | 11/2006 | Simmons |
| 2007/0064244 | A1 | 3/2007 | Mian et al. |
| 2009/0033949 | A1 | 2/2009 | Braghiroli |
| 2009/0055041 | A1 | 2/2009 | Mian et al. |
| 2014/0002641 | A1 | 1/2014 | Takahashi et al. |
| 2016/0282108 | A1 | 9/2016 | Martinod Restrepo et al. |
| 2017/0154414 | A1 | 6/2017 | Mian et al. |
| 2018/0222504 | A1 | 8/2018 | Birch et al. |

FOREIGN PATENT DOCUMENTS

| | | |
|---|---|---|
| CN | 102042806 A | 5/2011 |
| CN | 105526884 A | 4/2016 |
| DE | 3912544 A1 | 10/1990 |
| DE | 202016104124 U1 | 10/2016 |
| EP | 0751371 A2 | 1/1997 |

OTHER PUBLICATIONS

Koll, Hermann, EP Application No. EP 18855608.8, Supplemental Search Report, dated May 3, 2021, 9 pages.
CN Patent Application No. 201880070315.X, Office Action 1, dated Jun. 23, 2021, 10 pages (with English translation).
Parate, Chetashri, IN Application No. 202037016555, Office Action 1, Mar. 2, 2022, 7 pages.

* cited by examiner

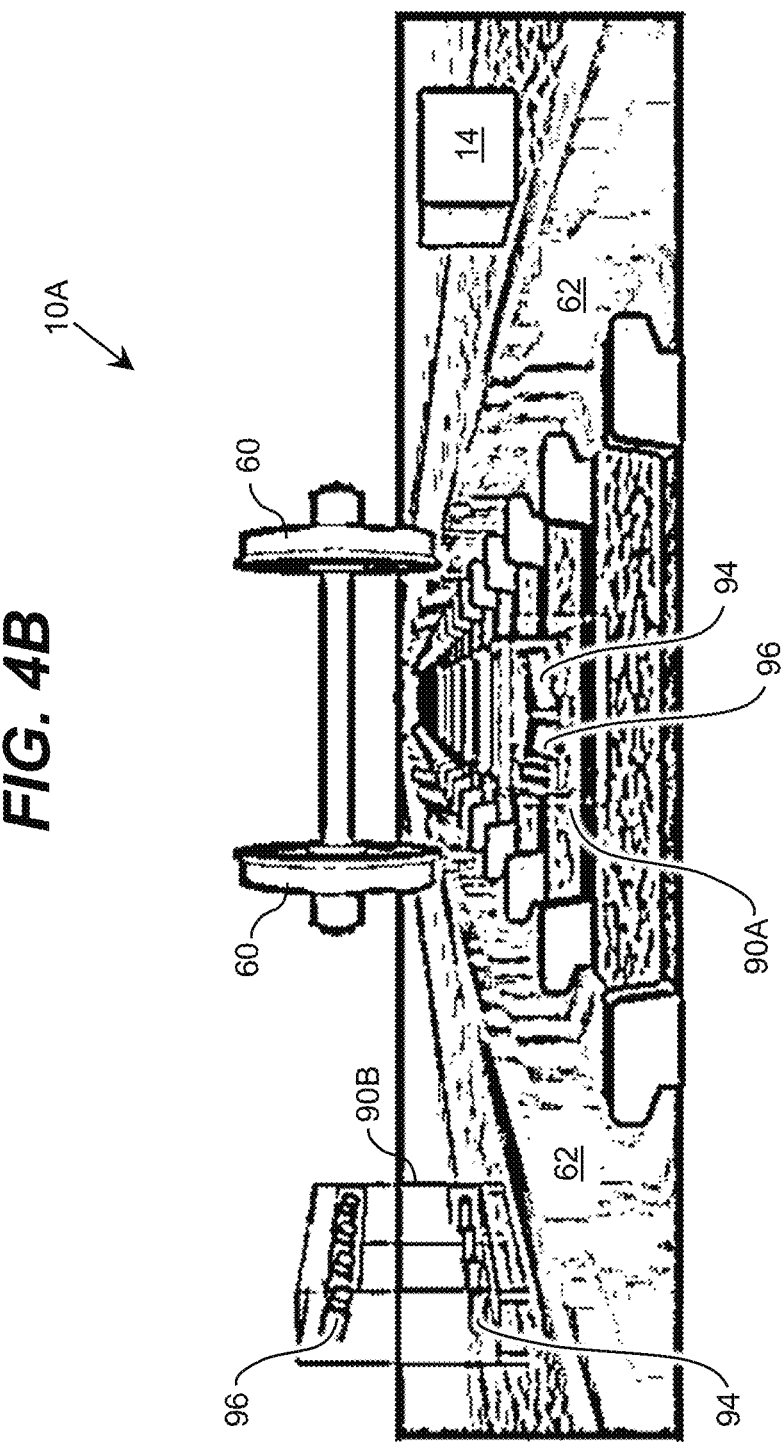

OPTICAL WHEEL EVALUATION

REFERENCE TO RELATED APPLICATIONS

The current application claims the benefit of U.S. Provisional Application No. 62/559,029, filed on 15 Sep. 2017, which is hereby incorporated by reference.

TECHNICAL FIELD

The disclosure relates generally to the evaluation of a wheel, and more specifically, to a solution for optically measuring a wheel.

BACKGROUND ART

Current wheel measurement solutions, such as those described in U.S. Pat. No. 5,636,026 entitled "Method and System for Contactless Measurement of Railroad Wheel Characteristics" and U.S. Pat. No. 6,768,551 entitled "Contactless Wheel Measurement System and Method", both of which are hereby incorporated herein by reference, effectively measure various attributes of a wheel. For example, when measuring a rail wheel, attributes such as the rim thickness, the flange thickness, the flange height, the reference groove diameter (when available), the wheel diameter and the wheel angle of attack, can be measured to ensure that continued operation of the wheel remains safe.

Embodiments of these solutions may not provide an effective solution for measuring other wheel attributes, such as a surface profile of the tread surface, which may be used to determine other defects that may impact the operable status of the wheel. For example, a wheel that includes a flat spot, or is sufficiently out-of-round (e.g., elliptical shape), or includes one or more gouges, cracks, shelled areas, etc., may not be desirable for continued operation. U.S. Pat. No. 7,564,569, also titled "Optical Wheel Evaluation", which is hereby incorporated by reference, describes several methods to achieve the stated objectives.

SUMMARY OF THE INVENTION

In light of the above, the Inventors recognize that a need exists for an improved optical evaluation solution that can accurately measure one or more wheel attributes for which current solutions may not provide sufficient and/or sufficiently accurate measurements. Advances in technology, specifically the availability of ultra-high speed smart cameras, have enabled new approaches to the optical measurement of wheel flaws, at higher speed and with improved resolution and with improved coverage of wheel defects. The inventors have found it advantageous to combine a number of techniques to optimally address all the wheel defects of interest.

Aspects of the invention provide a solution for optically evaluating a wheel along at least one circumference of the wheel. However, it is understood that in certain applications, such as the case of transit train traffic, where the same vehicle is inspected frequently in a short time frame, one can obtain full circumference worth of data by capturing and stitching partial circumference data acquired during any given trip through the system by the vehicle without deviating from the illustrative embodiments of the invention described herein. The evaluation utilizes information acquired by radiation reflecting off of one or more regions of the rotating wheel. An imaging device can acquire image data which is processed to evaluate the wheel. The radiation can comprise diffuse and/or coherent radiation. Image data for substantially an entire circumference of the wheel can be used in the evaluation.

In an embodiment, image data is obtained while the wheel moves along a path having a length of at least one circumference of the wheel. Also, anyone familiar with the art will recognize that the path can be linear travel or circular travel in place without deviating from the intent behind this invention. The path and/or wheel can be illuminated to enhance the resulting image data. One or more attributes of the wheel are measured based on the image data. The attributes can then be used to detect one or more defects in the wheel. In one embodiment, the wheel is a railway wheel, the wheel is illuminated, and the illuminated wheel is imaged by one or more cameras. However, it is understood that other types of wheels, tires, circular support members, cylinders, etc. can also be measured without deviating from the intent behind this invention.

A first aspect of the invention provides a method of evaluating a wheel, the method comprising: illuminating a path of the wheel, wherein a length of the path comprises at least one circumference of the wheel; obtaining image data for the wheel as it moves along the path; and measuring at least one attribute of the wheel based on the image data. By path it is understood that the wheel may be rolling along a path as part of a vehicle, mounted on the vehicle to inspect wheels on the vehicle, or rotating in place in a measuring machine. Many other paths can be imagined that are obvious variations of the simple paths described above.

A second aspect of the invention provides a system for evaluating a wheel, the system comprising: means for illuminating a path of the wheel, wherein an extent of the path comprises at least one circumference of the wheel; means for obtaining image data for the wheel as it moves along the path; and means for measuring at least one attribute of the wheel based on the image data. Also, the wheel can be measured by the system mounted on the train vehicles, or mounted by the side of the tracks, or mounted in a wheel repair shop without deviating from this invention.

A third aspect of the invention provides a method of generating a system for evaluating a wheel, the method comprising: obtaining a computer infrastructure; and deploying means for performing one or more of the steps described herein to the computer infrastructure.

A fourth aspect of the invention provides a method of evaluating a wheel, the method comprising: illuminating an area in which a wheel is rotating, wherein the illumination comprises at least one sheet of light, wherein each sheet of light is configured to intersect a side surface the wheel forming a chord on the side surface and intersect a tread surface of the wheel located on at least one side of the chord, wherein at least one of: the chord is located a substantially constant distance from a center of the wheel as the wheel rotates in the area or the chord forms a segment on the side surface of the wheel having a substantially constant height as the wheel rotates in the area; obtaining image data for the wheel as the wheel rotates in the area, wherein the image data includes a plurality of images acquired at distinct times when the wheel is located within the area, wherein the plurality of images include a plurality of images including an area of the tread surface of the wheel intersected by at least one of the set of lines of light; and evaluating the tread surface of the wheel based on the image data.

A fifth aspect of the invention provides a system for evaluating a wheel, the system comprising: a set of illumination devices configured to illuminate an area in which a wheel is rotating, wherein the set of illumination devices emit at least one sheet of light configured to intersect a side surface the wheel forming a chord on the side surface and intersect a tread surface of the wheel located on at least one side of the chord, wherein at least one of: the chord is located a substantially constant distance from a center of the wheel as the wheel rotates in the area or the chord forms a segment on the side surface of the wheel having a substantially constant height as the wheel rotates in the area; a set of imaging devices configured to acquire image data for the wheel as the wheel rotates in the area, wherein the image data includes a plurality of images acquired at distinct times when the wheel is located within the area, wherein the plurality of images include a plurality of images including an area of the tread surface of the wheel intersected by at least one of the set of lines of light; and means for evaluating the tread surface of the wheel based on the image data.

A sixth aspect of the invention provides a system for evaluating a wheel, the system comprising: a set of illumination devices configured to configured to illuminate at least a tread surface of the wheel with diffuse radiation; a set of imaging devices configured to acquire image data for the wheel as the wheel rotates in the area, wherein the image data includes a plurality of images acquired at distinct times when the wheel is located within the area, wherein the set of imaging devices acquire image data including a portion of the tread surface grazed by the diffuse radiation; and means for evaluating the tread surface of the wheel based on the image data.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed, which are discoverable by a skilled artisan.

Other aspects of the invention taught in U.S. Pat. No. 7,564,569 titled "Optical Wheel Evaluation" are not repeated in the current description.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 4A and 4B show perspective and side views, respectively, of an illustrative environment for evaluating rail wheels according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for optically evaluating a wheel along at least one circumference of the wheel. Image data is obtained while the wheel moves along a path having an extent of at least one circumference of the wheel in an illustrative embodiment. The wheel can be illuminated to enhance the resulting image data. One or more attributes of the wheel are measured based on the image data. The attributes can then be used to detect one or more defects in the wheel. In one embodiment, the wheel is a railway wheel, and a wheel segment is illuminated as the wheel surface moves along a path.

Figure 1:
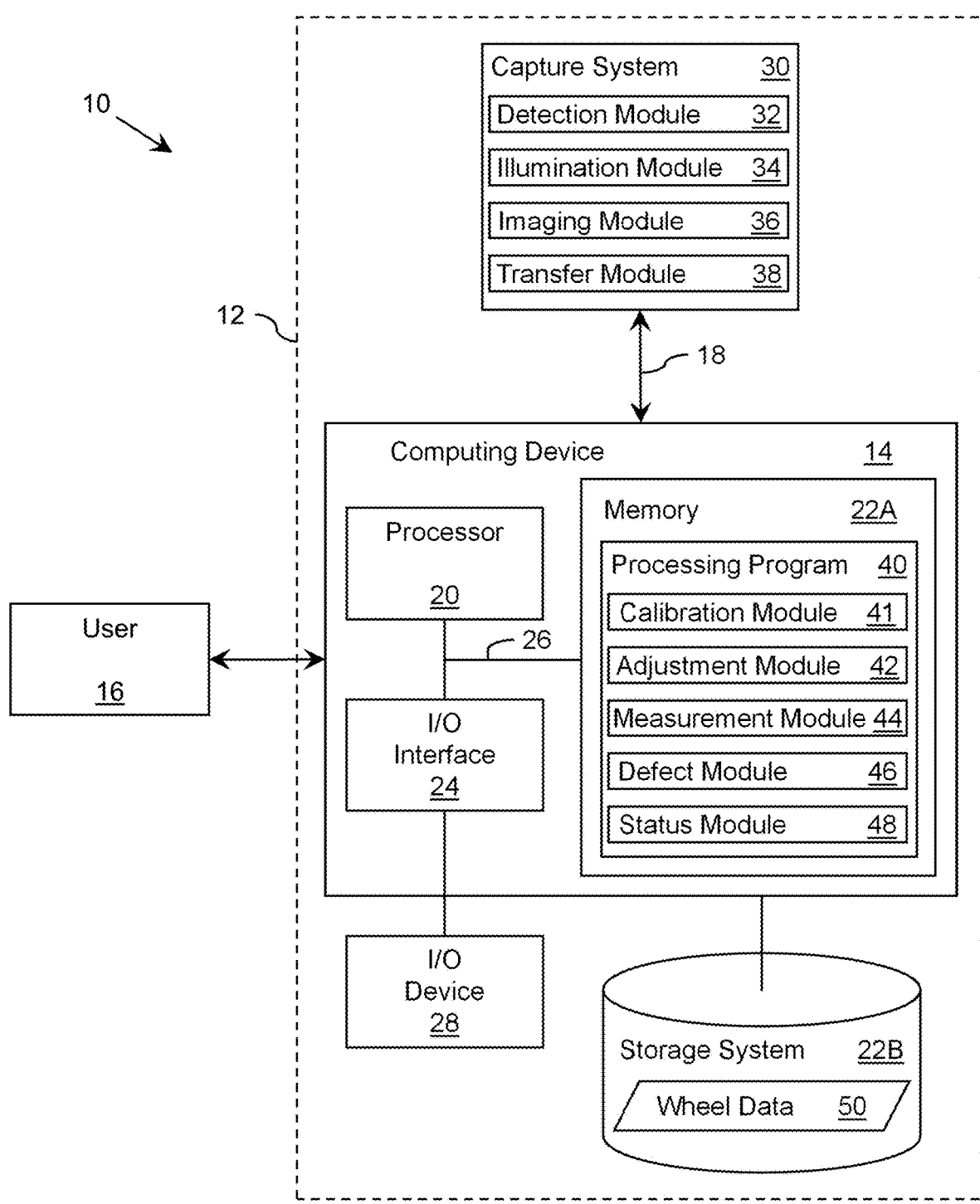
FIG. 1 shows a schematic view of an illustrative environment for evaluating a wheel according to an embodiment of the invention.

Turning to the drawings, FIG. 1 shows a schematic view of an illustrative environment 10 for evaluating a wheel according to an embodiment of the invention. To this extent, environment 10 includes a computer infrastructure 12 that can perform the various process steps described herein for optically evaluating the wheel. In particular, computer infrastructure 12 is shown including a capture system 30 for capturing wheel data 50 based on the wheel and a computing device 14 that comprises a processing program 40, which enables computing device 14 to measure the wheel by performing the process steps of the invention.

In general, capture system 30 is shown including a detection module 32, an illumination module 34, an imaging module 36, and a transfer module 38, each of which includes one or more devices for performing a corresponding function. For example, detection module 32 can include one or more devices for detecting the presence of a wheel and/or one or more attributes of the wheel, such as a speed, a brightness, a load, etc. Illumination module 34 can comprise one or more devices, such as a laser line generator, a thermal heater generating heated portions of the wheel, multi-spectral illuminators, x-ray source illuminators, ultrasonic energy based illuminators, a visible light source, and/or the like, for illuminating a path of the wheel and/or a portion of the wheel. Imaging module 36 can include one or more devices, such as a camera, for sensing illuminated energy returned back to the imaging module 36, e.g., a reflection obtained from the wheel, and generating image data based on the sensed reflection. Transfer module 38 can comprise one or more devices for transferring the image data and/or other data on the wheel to computing device 14 for storage as wheel data 50 and/or processing by the computing device 14 while executing the processing program 40.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as processing program 40, that is stored in memory 22A and/or storage system 22B. While executing computer program code, processor 20 can read and/or write data, such as wheel data 50, to/from memory 22A, storage system 22B, and/or I/O interface 24.

Bus 26 provides a communications link between each of the components in computing device 14. I/O device 28 can comprise any device that enables a user 16 (e.g., a human user or a system user) to interact with computing device 14 and/or any device that enables computing device 14 to communicate with one or more other computing devices included in the computer infrastructure 12, such as transfer module 38.

In any event, computing device 14 can comprise any general purpose computing article of manufacture capable of executing computer program code installed thereon (e.g., a personal computer, server, handheld device, etc.). Further, computing device 14 can comprise a specially designed ruggedized device, an embedded digital signal processing device, and/or the like. However, it is understood that computing device 14 and processing program 40 are only representative of various possible equivalent computing devices that may perform the various process steps described herein. To this extent, in other embodiments, computing device 14 can comprise any specific purpose computing article of manufacture comprising hardware, with or without computer program code, for performing specific functions, any computing article of manufacture that comprises a combination of specific purpose and general purpose hardware/software, or the like. In each case, the program code, when included, and the hardware can be created using standard programming and/or engineering techniques, respectively.

Capture system 30 communicates with computing device 14 over a communications link 18. Communications link 18 can comprise any combination of various types of wired and/or wireless communications links. To this extent, communications link 18 can comprise any combination of one or more types of networks (e.g., the Internet, a wide area network, a local area network, a virtual private network, etc.). In one embodiment, capture system 30 communicates with computing device 14 using a one-to-one wired connection, such as a universal serial bus (USB), Ethernet, or the like. Regardless, communications between the capture system 30 and computing device 14 may utilize any combination of various types of transmission techniques and/or communications protocols.

As previously mentioned and discussed further herein, processing program 40, when executing on the computing device 14, enables computing infrastructure 12 to evaluate the wheel based on the wheel data 50 received from capture system 30. To this extent, processing program 40 is shown including a calibration module 41 for calibrating one or more attributes of capture system 30, an adjustment module 42 for adjusting one or more attributes of the image data, and a measurement module 44 for calculating one or more measurements of the wheel. Further, processing program 40 is shown including a defect module 46 that determines whether one or more defects are present in the wheel and a status module 48 that determines whether the wheel is safe for continued use. Operation of capture system 30 and processing program 40 and each of their corresponding modules is discussed further herein. However, it is understood that some of the various modules shown in FIG. 1 can be implemented independently, combined, and/or stored in memory for one or more separate computing devices that are included in computer infrastructure 12. Further, it is understood that some of the modules and/or functionality may not be implemented, or additional modules and/or functionality may be included as part of environment 10.

Regardless, an embodiment of the invention provides a solution for evaluating a wheel by using electromagnetic energy, such as optical energy, in an illustrative embodiment. It is understood that while an illustrative embodiment of the invention is shown and described as performing an optical evaluation using image data generated based on visible light, embodiments of the invention can use image data generated based on electromagnetic radiation comprising wavelengths in one or more portions of the electromagnetic spectrum. To this extent, alternative embodiments of the invention can generate image data based on a reflection of a wheel illuminated using electromagnetic radiation in one or more of the visible, infrared, near infrared, ultraviolet, x-ray, etc., portion(s) of the electromagnetic spectrum. Further, image data can be generated based on other non-electromagnetic radiation-based illumination solutions, such as an acoustic signal, a sonar signal, a magnetic field disturbance, and/or the like. In embodiments of the invention, illumination module 34 may not be included as part of environment 10.

Figure 2:
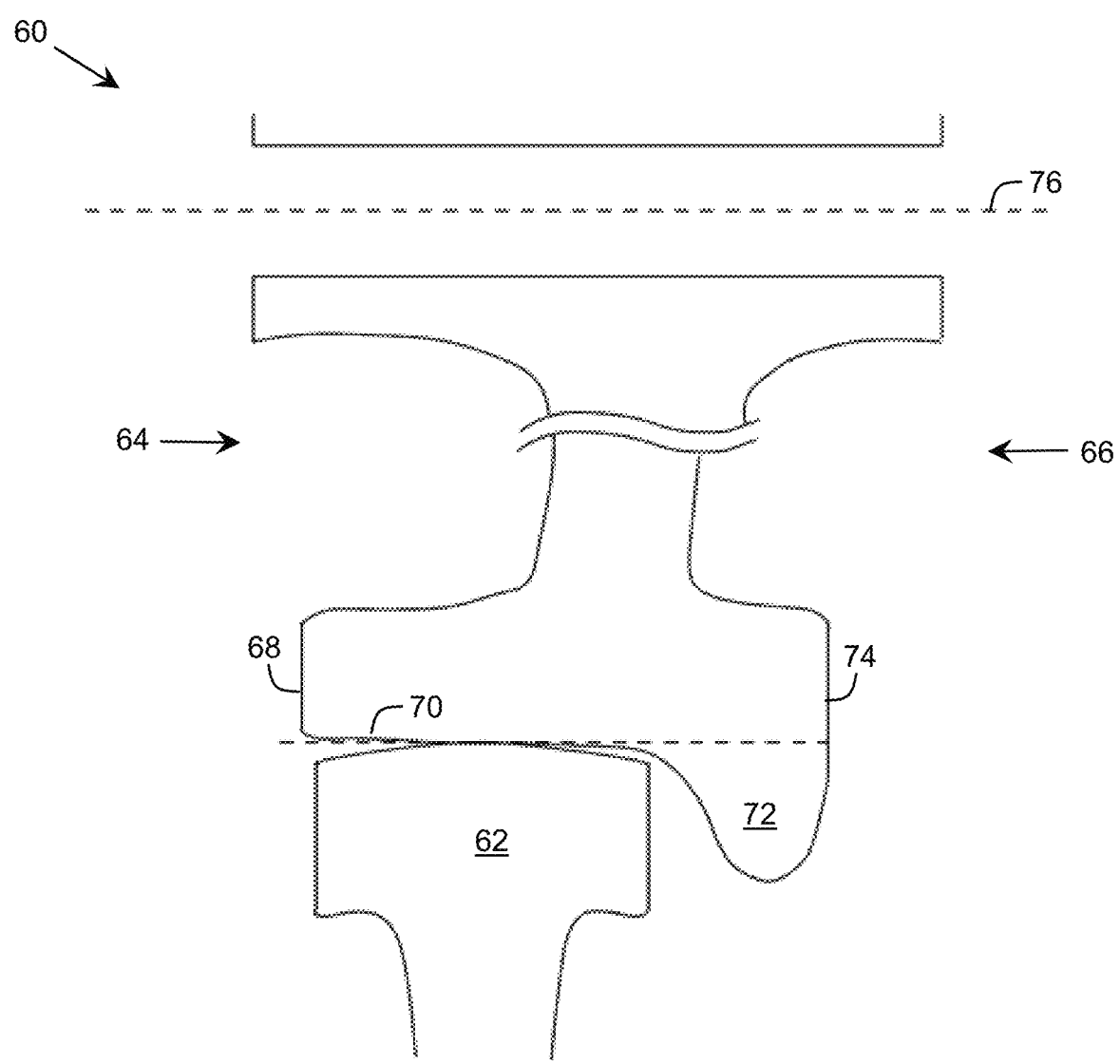
FIG. 2 shows a partial cross-section view of an illustrative rail wheel.

In one embodiment, environment 10 is used to measure various properties of a rail wheel. For example, FIG. 2 shows a partial cross-section view of an illustrative rail wheel 60. In general, rail wheel 60 can be utilized on a locomotive, a railroad car, and/or any other vehicle that rides on one or more rails 62. It is understood that rail wheel 60 is only illustrative of various types of rail and non-rail wheels. Various attributes/properties of rail wheel 60 can be measured by an embodiment of a computing infrastructure 12 (FIG. 1) described herein. For example, attributes of rail wheel 60 such as a diameter/radius, a flange height, a reference groove circle radius, a rim thickness and/or the like, can be measured. Additionally defects in the wheel, such as thermal cracks, flat spots, out of round, and/or the like, can be measured. Similarly, any desired attributes of a non-rail wheel can be measured using an embodiment of the invention. To this extent, aspects of the invention are not limited to measuring one or more attributes of any type for a particular rail/non-rail wheel 60.

In any event, rail wheel 60 is shown supported by a rail 62 and includes a field side 64 and a gauge side 66. Typically, field side 64 faces outward from a pair of rails 62 while gauge side 66 faces inward from a pair of rails 62. Adjacent to rail 62, rail wheel 60 includes a field side rim face 68, a tread surface 70, a flange 72, and a gauge side rim face 74. During normal operation, rail wheel 60 contacts rail 62 along tread surface 70 and rotates about a centerline 76, while flange 72 prevents wheel from leaving rail 62 due to outward forces present during normal operation. As a result, interaction between rail wheel 60 and rail 62 results in wear to tread surface 70 and flange 72.

Figure 3A:
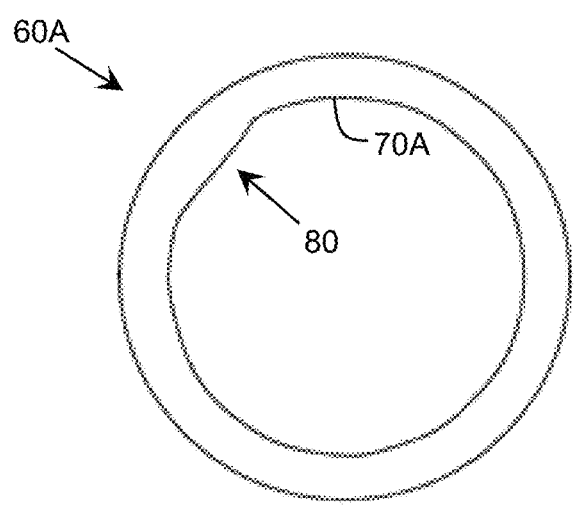
FIGS. 3A-3C show various defects of a rail wheel.
Figure 3B:
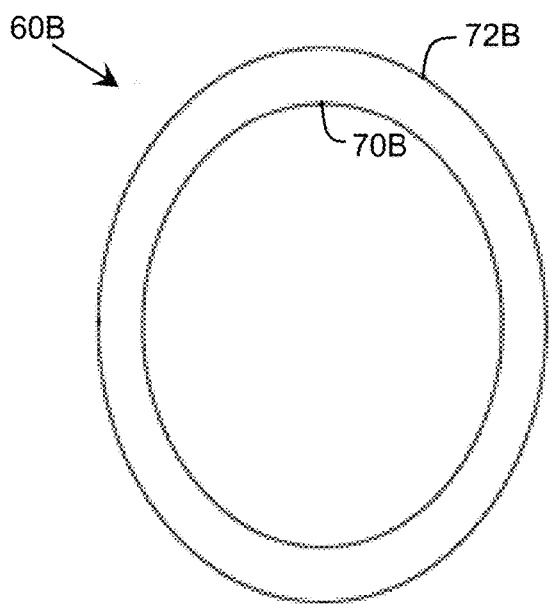
Figure 3C:
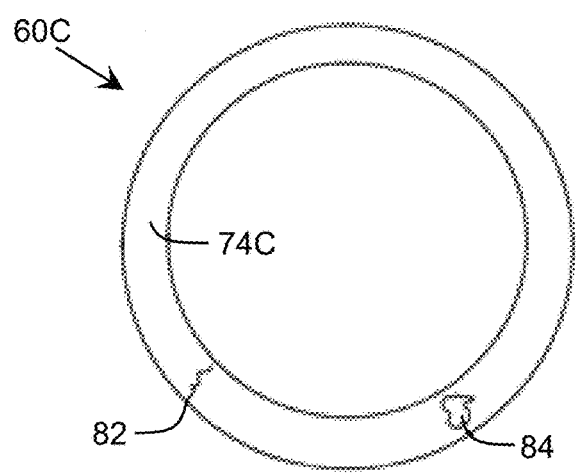

Uneven interaction between rail wheel 60 and rail 62 can create one or more defects in rail wheel 60. For example, FIG. 3A shows an illustrative rail wheel 60A in which tread surface 70A includes a flat spot 80. Flat spot 80 can be caused, for example, by sustained locking of a brake system. Further, FIG. 3B shows an illustrative rail wheel 60B comprising an out-of-roundness (OOR) defect due to an elliptical (e.g., oval) shape of tread surface 70B and/or flange 72B, which can be caused by uneven interaction due to improper installation of wheel 60B and/or improper location of a central hole of rail wheel 60B (e.g., offset from true center). Still further, debris, heat, a manufacturing defect, and/or the like, can create flat spot 80, an out-of-round rail wheel 60B, and/or one or more additional defects, such as a crack (e.g., thermal crack), a gouge, a shelled area, etc. To this extent, FIG. 3C shows an illustrative rail wheel 60C, in which a gauge side rim face 74C comprises a narrow gouge 82 and a wider defect, such as a thermal crack 84. It is understood that the various defects shown in FIGS. 3A-C are only illustrative of the various possible defects of a rail wheel 60A-C that can be detected using the invention. Further, it is understood that the various defects are shown in an exaggerated manner for clarity. In practice, the invention can be used to detect much smaller, but identical in principle, defects of a rail wheel 60A-C.

Figure 4A:
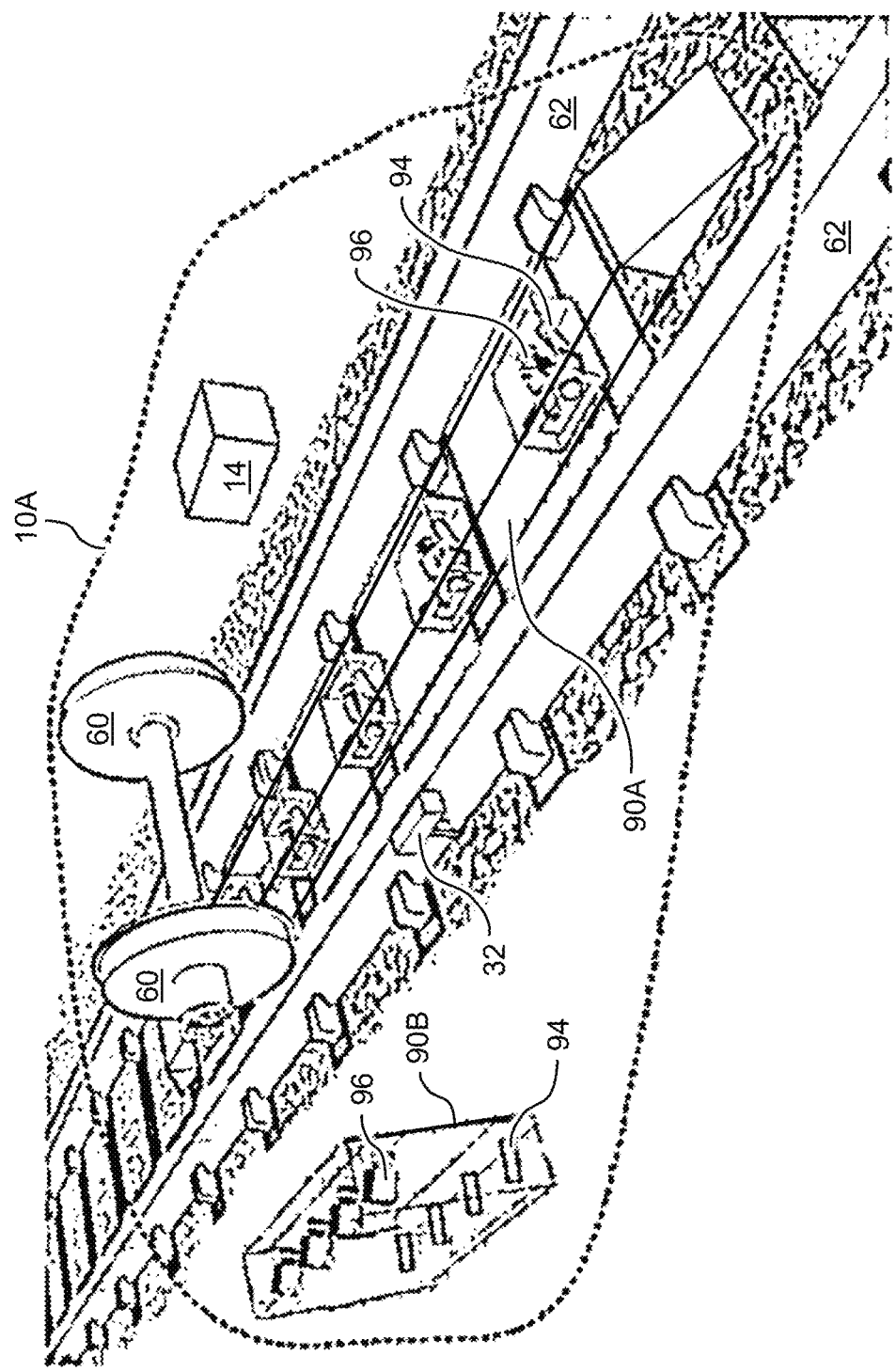

FIGS. 4A and 4B show perspective and side views, respectively, of an illustrative environment 10A for measuring rail wheels 60 according to an embodiment. In general, rail wheels 60 can be moving in either direction while being supported by rails 62 as the rail wheels 60 travel past the environment 10A. The environment 10A can include a detection module or modules 32, which can be located and operated in such a manner as to detect the presence of rail wheels 60 that are approaching enclosures 90A, 90B from one or either direction. Each enclosure 90A, 90B can comprise any type of ruggedized weatherproof enclosure and can be secured to the ballast, railroad ties, rail, and/or concrete using any solution. Depending on the requirements of the application, enclosures 90A, 90B can be located on the field side, gauge side, or both sides of the rail. Regardless, each enclosure 90A, 90B can be configured to protect one or more components of the environment 10A from harmful exposure to the surroundings (e.g., weather, impacts, and/or the like) in which the components are deployed. It is understood that the enclosures 90A, 90B may not be necessary for all applications in which the environment 10A can be utilized, e.g., such as use of the environment 10A in a controlled environment, such as in a factory, repair shop, etc.

In general, illumination module 34 (FIG. 1) includes one or more illumination devices, while imaging module 36 (FIG. 1) includes one or more imaging devices. To this extent, enclosures 90A, 90B are shown including a plurality of illumination device/imaging device pairs, such as illumination device 94 and imaging device 96, each of which can be attached to enclosure 90A, 90B using any solution. Also advantageously, illuminators 94 can be attached to the rail, railroad ties, and/or the like, with imaging performed by cameras 96 in enclosure 90B.

In operation, detection module 32 senses a presence of rail wheel(s) 60 and generates a signal, which is sent to illumination devices 94 and imaging devices 96. In response to the signal, each illumination device 94/imaging device 96 operates to obtain image data of rail wheel 60 and rail 62. Detection module 32 can further sense a speed at which rail wheel 60 is traveling. In this case, the operation of illumination devices 94 and/or imaging devices 96 can be adjusted based on the speed. For example, environment 10A can be configured to process rail wheels 60 moving at speeds of up to approximately fifty miles per hour (eighty kilometers per hour) dependent upon the particular illumination devices 94 and imaging devices 96. Based on the actual speed of rail wheel 60, an amount of time that illumination devices 94 illuminate a region through which the rail wheel 60 will travel can be adjusted and/or a number of images per second that are captured by imaging devices 96 can be adjusted to obtain the desired resolution, thereby conserving system resources (e.g., memory) for slower moving rail wheels 60. Further, when rail wheel 60 is detected as moving faster than a maximum speed, illumination devices 94 and/or imaging devices 96 can remain idle while rail wheel 60 passes. In this case, an error code or the like can be generated by detection module 32. Additionally, detection module 32 can sense a brightness of rail wheel 60 and the operation of illumination devices 94 and/or imaging devices 96 can be adjusted based on the brightness in a known manner.

It is understood that various solutions can be implemented to adjust an amount of time that each illumination device 94 and/or imaging device 96 operates while imaging rail wheel 60. In one embodiment, detection module 32 signals a first illumination device 94 and/or imaging device 96 over which rail wheel 60 will pass. In response, the first imaging device 96 can be activated and begin imaging rail wheel 60. Using the image data, imaging module 36 (FIG. 1) can determine when rail wheel 60 has reached a particular point in the field of view of the first imaging device 96 (e.g., seventy percent across). Once this point is reached, imaging module 36 can activate the next illumination device 94 and/or imaging device 96, which begins imaging rail wheel 60. Subsequently, the previous imaging device 96 can be turned off when imaging module 36 determines that rail wheel 60 has left its field of view and/or when imaging module 36 determines that rail wheel 60 has reached a particular point in the field of view of the next imaging device 96. In either case, only two imaging devices 96 will be operating at any one time, thereby reducing the power demand at any one time on the system.

As illustrated in FIGS. 4A and 4B, the environment 10A can include multiple illumination device 94 and imaging device 96 pairs located on the inside of the rails 62. For example, the enclosure 90A is shown including eight pairs of illumination device 94 and imaging device 96 for acquiring image data for each rail wheel 60. In particular, each rail wheel 60 can be imaged by up to four imaging devices 96 as it passes through the environment 10A. While each enclosure 90A, 90B is shown including four illumination device 94 and imaging device 96 pairs, it is understood that any number of pairs located inside and/or outside the rails can be utilized. Additionally, only a subset of the illumination device 94 and imaging device 96 pairs may be operated to image a rail wheel 60 as it moves through the environment 10A.

In an embodiment, an illumination device 94 located between the rails projects electromagnetic radiation, such as one or more laser lines, onto rail 62 and the gauge side 66 (FIG. 2) of rail wheel 60 as it moves along rail 62. While rail wheel 60 is within a corresponding field of view, an imaging device 96 located between the rails captures image data, such as one or more images, of rail wheel 60 and rail 62 based on a reflection of the electromagnetic radiation. Subsequently, the image data is communicated to computing device 14 (FIG. 1) for processing by processing system 40 (FIG. 1). The embodiment in which enclosure 90A is disposed between the rails is more fully described in the teachings of U.S. Pat. No. 7,564,569 titled "Optical Wheel Evaluation" and is not further described in detail herein.

It is understood that environment 10A is only illustrative of various possible alternative environments. For example, while only a single detection module 32 is shown, a second detection module could be located on another side of enclosures 90A, 90B to sense rail wheels 60 approaching from the opposite direction. Additionally, the relative locations of the enclosures 90A, 90B and detection module 32 as illustrated is only illustrative and can vary as required. In any event, it is understood that detection module 32 must be located a sufficient distance from enclosures 90A, 90B to provide enough time to prepare illumination device(s) 94 and/or imaging device(s) 96. Such a distance will vary based on, for example, a desired maximum speed at which rail wheels 60 can travel through the environment 10A.

Additionally, while multiple illumination device 94/imaging device 96 pairs are shown, it is understood that any number (e.g., one or more) of illumination devices 94 and/or imaging devices 96, paired or unpaired, could be used. For example, a single illumination device 94 may be provided, which directs the radiation at rail wheel 60 as it passes along rail 62 and is imaged by more than one imaging device 96. Further, rail wheels 60 on only a single rail 62 could be imaged and/or rail wheel(s) 60 could be imaged from both the field side 64 (FIG. 2) and gauge side 66 (FIG. 2). To this extent, while the environment 10A is shown including a single enclosure 90B configured for imaging the field side 64 of one of the rail wheels 60, it is understood that an environment described herein can include a second enclosure located on an opposite side of the rails 62 for imaging the field side of the other rail wheel 60. Additionally, depending on the type of image data desired to be acquired and analyzed for the rail wheels 60, the imaging device(s) 96 located outside of the rails 62 can be configured to acquire image data of the gauge side of the rail wheel 60 located on the opposite rail 62 and/or an environment can be implemented without one or more of the enclosures 90A, 90B.

In an embodiment, rail wheel 60 traveling through the environment 10A is imaged by imaging device(s) 96 over a distance that comprises at least one full revolution of rail wheel 60. To this extent, illumination device(s) 94 and/or imaging device(s) 96 can be configured to illuminate and/or image a distance along the rails 62 that is at least the circumference of the largest wheel to be imaged. The actual distance that is illuminated and/or imaged can remain constant (in which case a smaller rail wheel 60 is imaged for more than one revolution) or adjusted based on an actual size of rail wheel 60. Regardless, it is understood that multiple wheels, such as rail wheel 60, may require imaging simultaneously, e.g., two adjacent rail wheels 60 may be separated by a distance that is less than the circumference of each wheel. To this extent, illumination device(s) 94 and/or imaging device(s) 96 can be capable of illuminating and/or imaging multiple wheels simultaneously.

However, it is understood that this need not be the case. For example, where repeat railway traffic is normal, e.g., the same vehicle passes by the environment many times a day or a week, it will likely be the case that even if only a part of the circumference is examined at any single time, the full circumference will be examined over time. To this extent, in the case of transit train traffic, where the same vehicle is inspected frequently in a short time frame, an embodiment of an environment described herein can obtain full circumference worth of data over a relatively short time duration by capturing and stitching partial circumference data acquired during any given trip through the environment. The partial circumferential image capture approach can provide, for example, a significant cost savings for smaller transits who are just as satisfied in capturing full circumference over, for example an entire day, and analyzing the partial or full circumference worth of images.

Figure 5:
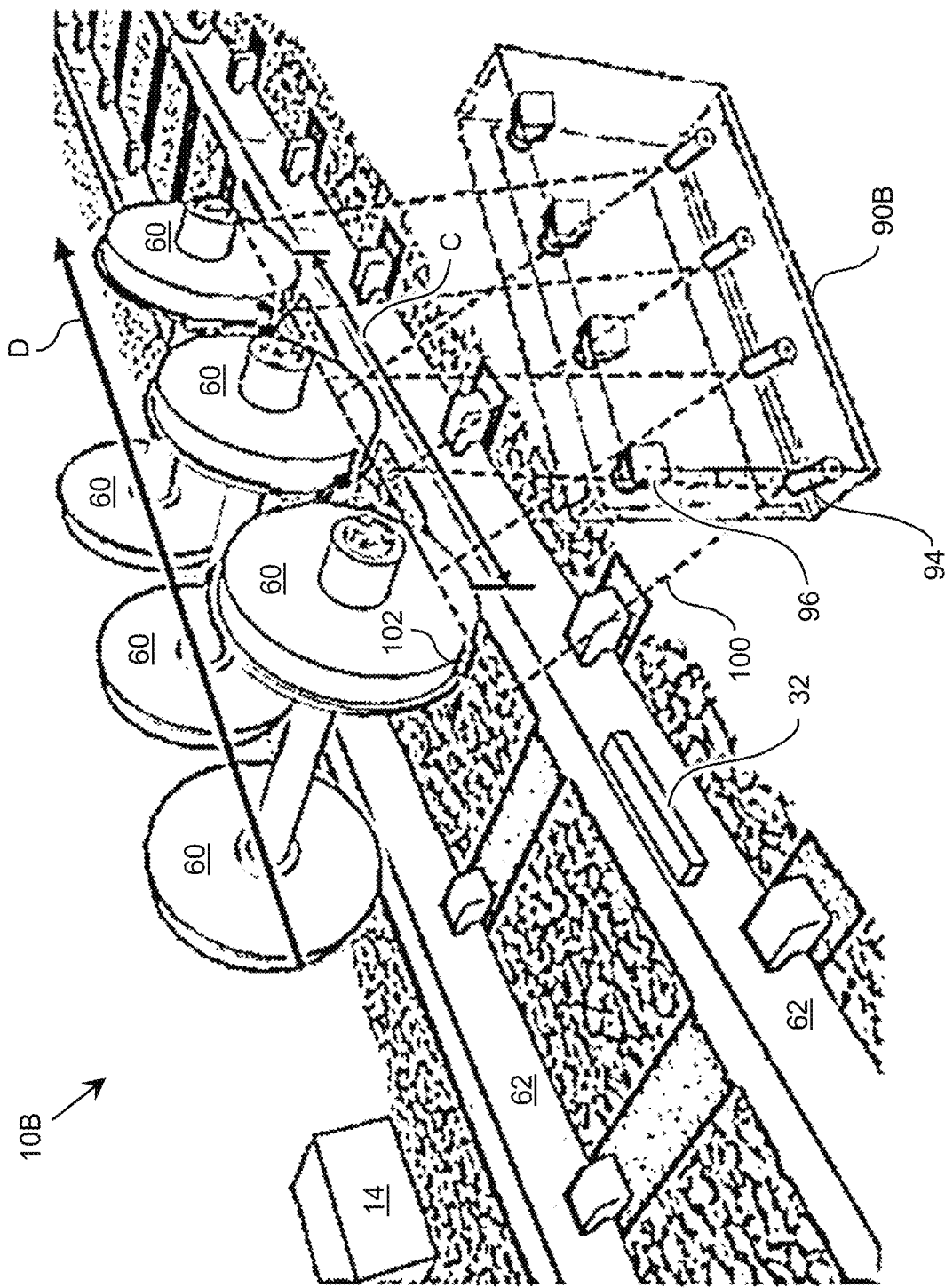
FIG. 5 shows an illustrative environment including an alternative illumination configuration for obtaining image data for a rail wheel and a rail according to an alternate embodiment.

FIG. 5 shows an illustrative environment 10B including an alternative illumination configuration for obtaining image data for rail wheel 60 and rail 62 according to an embodiment. In this case, the illumination devices 94 and the imaging devices 96 are located on the field side of rails 62. In an embodiment, referring to FIGS. 4A-5, one or more illumination devices 94 generate a plurality of sheets of light disposed so that each sheet is at an advantageous angle with respect to horizontal, such as sheet of light 100 along a path of rail wheel 60 shown in FIG. 5. For example, when the rail 62 is substantially horizontal, the projection axis of the illuminators 94 can be set to be substantially horizontal so that the sheet of light intersects the wheel at a fixed location with a fixed elevation relative to rail 62 as wheel 60 moves along the rail in direction D. Multiple sheets of light 100 are projected onto wheel 60 over a total distance C that is greater than or equal to one full revolution of rail wheel 60, i.e., at least one circumference of rail wheel 60.

Where the sheets of light 100 intersect wheel 60, lines of light 102 are formed along the field side and tread surface of the wheel 60. As wheel 60 moves along the rail 62 in direction D, the horizontal axis of the sheet of light 100 will intersect wheel 60 always at the same height above rail 62, producing line 102 that is imaged by an imaging device 96. To this extent, each sheet of light 100 can form a chord on the field side of the rail wheel 60 that forms a segment on the field side of the rail wheel having a substantially constant height, which approximately corresponds to the height of the sheet of light 100 above the rail 62. The chord formed on the field side of the rail wheel 60 can be processed to identify an end location of the line of light 102 formed on the tread surface and/or processed to determine one or more attributes of the wheel (e.g., diameter of the wheel, presence of a flat spot, presence of defect(s) on the field side, and/or the like). While only a single sheet of light 100 and corresponding line of light 102 is shown for clarity, it is understood that multiple parallel lines of light 102 can be concurrently produced on the wheel 60.

The speed of imaging of imaging device 96 can be adjusted based upon the speed of the wheel 60 to produce the desired spatial resolution on the surface of wheel 60 as it moves along path D. For example, in consecutive images, a line of light 102 can be spaced along the tread surface of a rotating wheel 60 by approximately one-eighth of an inch (e.g., three millimeters) or less to provide a resolution for identifying defects that is typically desired in the rail industry. It is understood that a higher or lower resolution can be obtained by operating the imaging device at higher or lower speeds respectively.

For each line of light 102 formed on rail wheel 60, the corresponding image data for the lines of light 102 will be different in that the image was obtained from a different location on wheel 60. The distance between successive lines of light 102 can be determined by the speed of imaging device 96 and the speed of wheel 60 along rail 62.

It is understood that use of substantially horizontal projection of sheets of light 100 is only one laser-based solution for illuminating rail wheel 60. For example, as taught in U.S. Pat. No. 7,564,569, substantially vertical lines of light can be projected on onto wheel 60 from illuminators on the gauge side of the rail and below the top of rail and imaged by imaging devices also located on the gauge side of the rail 62 as shown in FIG. 4B. In an embodiment, electromagnetic radiation is projected onto rail wheel 60 in a pattern, such as a moire pattern. In this case, one or more deformations of the pattern can reveal a state of stress and/or other flaws in rail wheel 60. Further, another solution can utilize a series of laser micrometers through rail 62 to detect variations in height.

Figure 6:
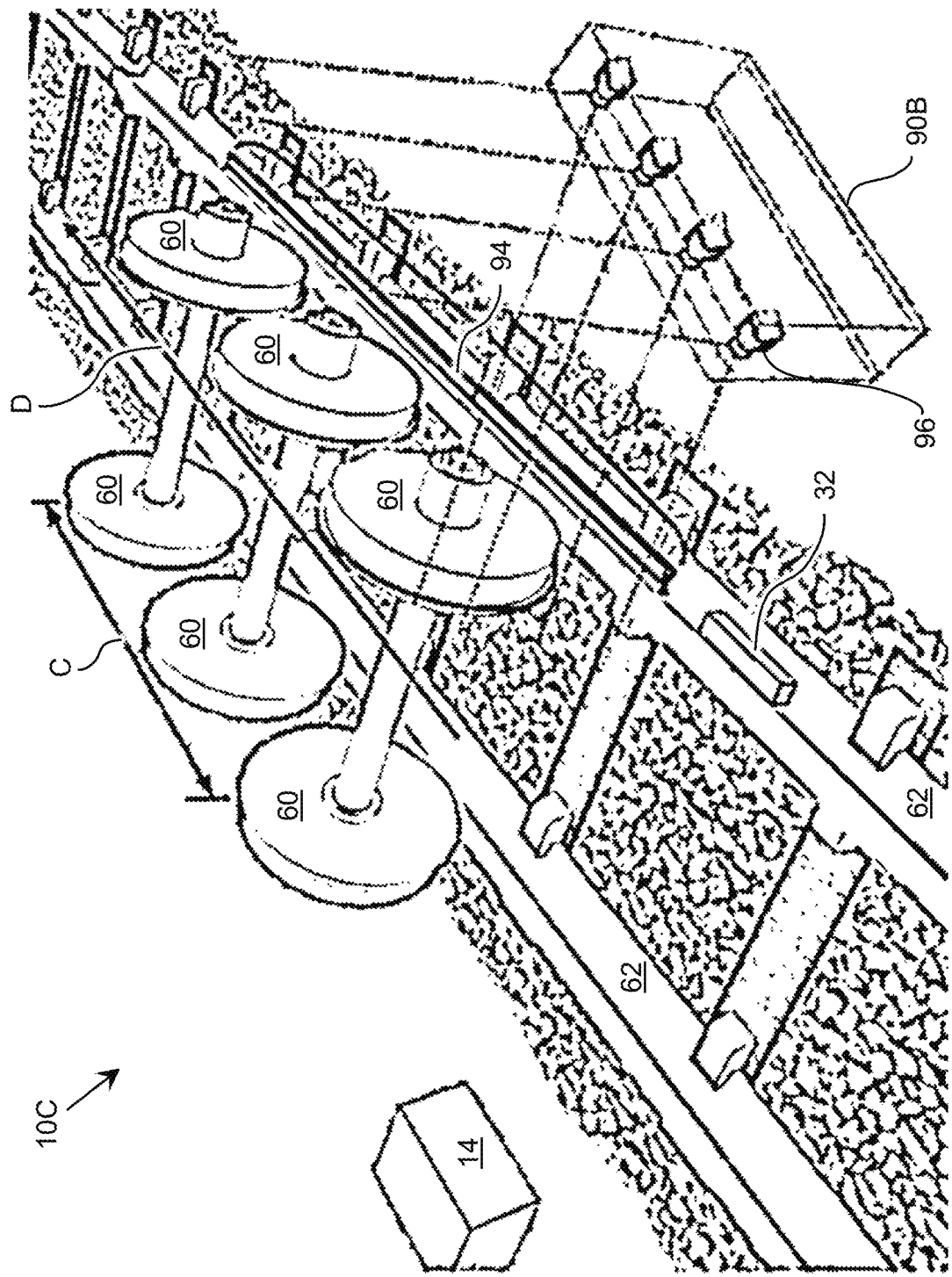
FIG. 6 shows an illustrative environment including another alternative illumination configuration for obtaining image data for a rail wheel and a rail according to an embodiment.

Further, embodiments of the invention can incorporate non-laser based illumination. For example, one or more bright light emitting diode (LED) and/or halogen lamps can illuminate rail wheel 60 from the field side of rail 62 in a strobed or continuous manner. In an embodiment, grazing illumination, such as diffuse grazing illumination, is utilized to enhance one or more attributes of the rail wheel 60. To this extent, FIG. 6 shows an illustrative environment 10C including an alternative illumination configuration for obtaining image data for rail wheel 60 according to an embodiment of the invention. In this case, the illumination source 94 is diffuse and substantially constant along distance C. The illumination source 94 can be configured to emit diffuse radiation directed upward. As the rail wheel 60 moves through the environment 10C the diffuse light will illuminate a portion of the field side and tread surface of the rail wheel 60, with endpoints of the illuminated portion being only grazed by the diffuse radiation (e.g., impacted from a sharp angle). As used herein, a surface is grazed by radiation when the angle between the surface and the radiation is 30 degrees or less.

By locating illumination 94 source close to the rail 62 and projecting diffuse light onto wheel 60, defects tend to be highlighted by a technique known in the machine vision art as shape from shadows. These shadows can be particularly pronounced in the regions of the tread surface that are grazed by the diffuse radiation. One or more imaging devices 96 are disposed on the field side of the rail to image the wheel 60 as it moves through a path C of a least one circumference. The images thus obtained will tend to highlight very fine defects, such as fine cracks, by placing these defects into shadow.

Returning to FIGS. 4A-4B, each imaging device 96 can comprise any combination of known imaging electronics, optics (e.g., one or more lenses) and a camera mount. The optics can comprise any configuration appropriate for the particular environment 10A. In any event, each imaging device 96 can comprise a standard digital camera or a high speed profiling camera connected to computing device 14 and/or transfer module 38 (FIG. 1) using a Universal Serial Bus (USB), Ethernet, and/or the like. Alternatively, imaging device(s) 96 can comprise a line-scan camera, an analog camera, and/or another type of camera that includes sufficient resolution and speed to acquire image data suitable for analysis in the particular application. In one embodiment, rail wheel 60 can move at a speed of up to approximately thirty miles per hour (e.g., fifty kilometers per hour). The maximum speed of wheel 60 along rail 62 will determine the performance required for the type of imaging device used. Additionally, it is understood that each imaging device 96 includes other functional requirements for machine vision applications, such as exposure control, progressive scan, anti-blooming, and the like.

The imaging electronics can comprise support electronics and image sensors such as CCD chips, which are usually square or broadly rectangular in their sensing area. However, as can be seen in FIG. 5, the area of interest in the image data, e.g., that area of rail wheel 60 that intersects lines of light 100, is longer horizontally than vertically. To this extent, imager chips which have a much larger horizontal to vertical aspect ratio, for example 2 to 1, can be chosen to emphasize the horizontal resolution of the system. To minimize the number of imaging devices 96 required to image the full circumference of the largest wheel 60 as it travels over a path at least one circumference long, nonstandard lens to imaging device mounting methods, such as a bellows or Scheimpflug adapter, can increase the effective field of view of the camera without decreasing the image resolution that would result from merely using a wider angle lens.

It is understood that many other optical arrangements, such as Fresnel or cylindrical lenses, are possible to produce advantageous imaging characteristics as will be recognized by one skilled in the art.

Returning to FIGS. 4A and 4B, while each imaging device 96 can generate color and/or monochrome images based on visible light, it is understood that one or more imaging devices 96 can generate images based on electromagnetic radiation in the visible, near infrared, infrared, ultraviolet, X-rays, and/or other portions of the electromagnetic spectrum.

To this extent, each illumination device 94 can illuminate rail wheel 60 using any configuration of one or more electromagnetic radiation-based illumination solution(s), which can subsequently be used to obtain image data by a corresponding electromagnetic radiation-based imaging device 96. The use of other types of non-visible illumination can enable imaging devices 96 to obtain image data that can be used to measure various attributes of rail wheel 60 that are not revealed by visible light. For example, the use of image data obtained based on infrared light can be used to detect a temperature difference between various surfaces, which can indicate over heating due to one or more defects (e.g., flat spot). Similarly, infrared or X-ray radiation-based image data can be used to measure one or more internal attributes of rail wheel 60, which in turn may be used to determine one or more sub-surface defects of rail wheel 60 that are hidden from visible light.

Further, additional data on rail wheel 60 can be extracted from multi-spectral image data. In particular, one or more illumination devices 94 can illuminate rail wheel 60 with electromagnetic radiation in different portions of the electromagnetic spectrum and/or with electromagnetic radiation and non-electromagnetic radiation-based illumination, while one or more imaging devices 96 obtain image data for each illumination solution. Measurement module 44 (FIG. 1) can combine the image data using any known image fusion technique and analyze the resulting multi-spectral image data. For example, the measurement module 44 can use a combination of visible light and 3D laser imagery in the detection of flat spots. Detection of fine cracks and other tread defects may be made more reliable, robust, and/or accurate by identifying both a difference in height of rail wheel 60 (e.g., which can result in a chord having a different length) and/or a shadow pattern that may be present due to a defect. It is understood that this example is only illustrative of many potential multi-spectral applications as will be recognized by one in the art. To this extent, image data can be generated based on any combination of electromagnetic radiation-based illumination solutions.

In any event, returning to FIG. 1, transfer module 38 transfers image data captured by imaging module 36 to computing device 14 for storage and/or processing by processing system 40. Further, transfer module 38 can transfer additional data on each wheel 60 (FIG. 2) to computing device 14. For example, transfer module 38 can include a timestamp for the image data, a number for wheel 60 in a sequence of wheels, a side of a pair of tracks 62 (FIG. 2) on which wheel 60 was located, an identifier for the particular imaging device(s) 96 (FIG. 4) that acquired the data, and/or the like. To this extent, transfer module 38 can comprise a computing device that is placed within or adjacent to an enclosure 90A, 90B and is in communication with imaging devices 96. Alternatively, each illumination device 94 (FIG. 4) and/or imaging device 96 can communicate directly with and/or be controlled by computing device 14. In this case, transfer module 38 can be implemented as part of the computing device 14, e.g., as a module in processing program 40. Regardless, processing program 40 can receive the image data and/or additional data and process and/or store it as wheel data 50.

After installation, calibration module 41 can calibrate capture system 30. To this extent, calibration module 41 can perform a series of calibration operations that can be performed with and/or without the assistance of user 16. For example, calibration module 41 can obtain a set of baseline images of known calibration targets placed on the rail taking the place of wheels 60 present during actual measurement. The set of baseline images are processed by calibration module 41 to determine the mapping to transform measurement images into Cartesian coordinate data over the entire measurement volume for each imaging device 96 and/or illumination device 94 in the capture system 30. To this extent, calibration module 41 can account for any variation in the fields of view between imaging devices 96 (FIG. 4).

Further, calibration module 41 can obtain image data for one or more "known good" rail wheels 60. This image data can be analyzed and processed as described herein to determine whether all modules/systems in environment 10 are functioning properly and yield the correct results. When one or more errors are detected, an adjustment to the corresponding module/system can be made and image data can be reacquired until all modules/systems generate the correct results. When operation of one or more modules/systems is adjusted based on one or more conditions, such as lighting, speed, and/or the like, calibration module 41 can obtain image data for rail wheels 60 for multiple variations of each condition to confirm/adjust the correct operation of all modules/systems in environment 10 in a known manner.

In operation, adjustment module 42 can perform one or more adjustments on the image data. For example, adjustment module 42 can perform second moment centroiding or other estimation algorithms to find the best estimate of the subpixel location of the center of the laser line for the case of laser illumination. Further, adjustment module 42 can enhance/manipulate contrast and/or brightness for the image data to remove noise or compensate for low illumination, glare, surface conditions of wheel 60, and/or the like. To this extent, adjustment module 42 can implement any combination of known algorithms as desired for a particular application. Subsequently, adjustment module 42 can store the adjusted image data as wheel data 50.

In any event, measurement module 44 can extract various measurements from the image data, which are subsequently stored as wheel data 50. In one embodiment, measurement module 44 initially determines the location of rail wheel 60 (FIG. 2) in a particular image. For example, in one embodiment, the wheel 60 may appear to move diagonally across the image field of view as the wheel moves along rail 62. Measurement module 44 can examine a particular region of the image for known features such as edges, variations in lines of light 102 (FIG. 5), and/or other features that indicate the location of rail wheel 60 in the field of view. Also, the top edge of rail 62 will be located in a fixed and unique location in each image as the wheel 60 moves through the field of view of imaging device 96 so the edge of rail 62 (FIG. 2) can be used as a baseline for detecting rail wheel 60.

Figure 7:
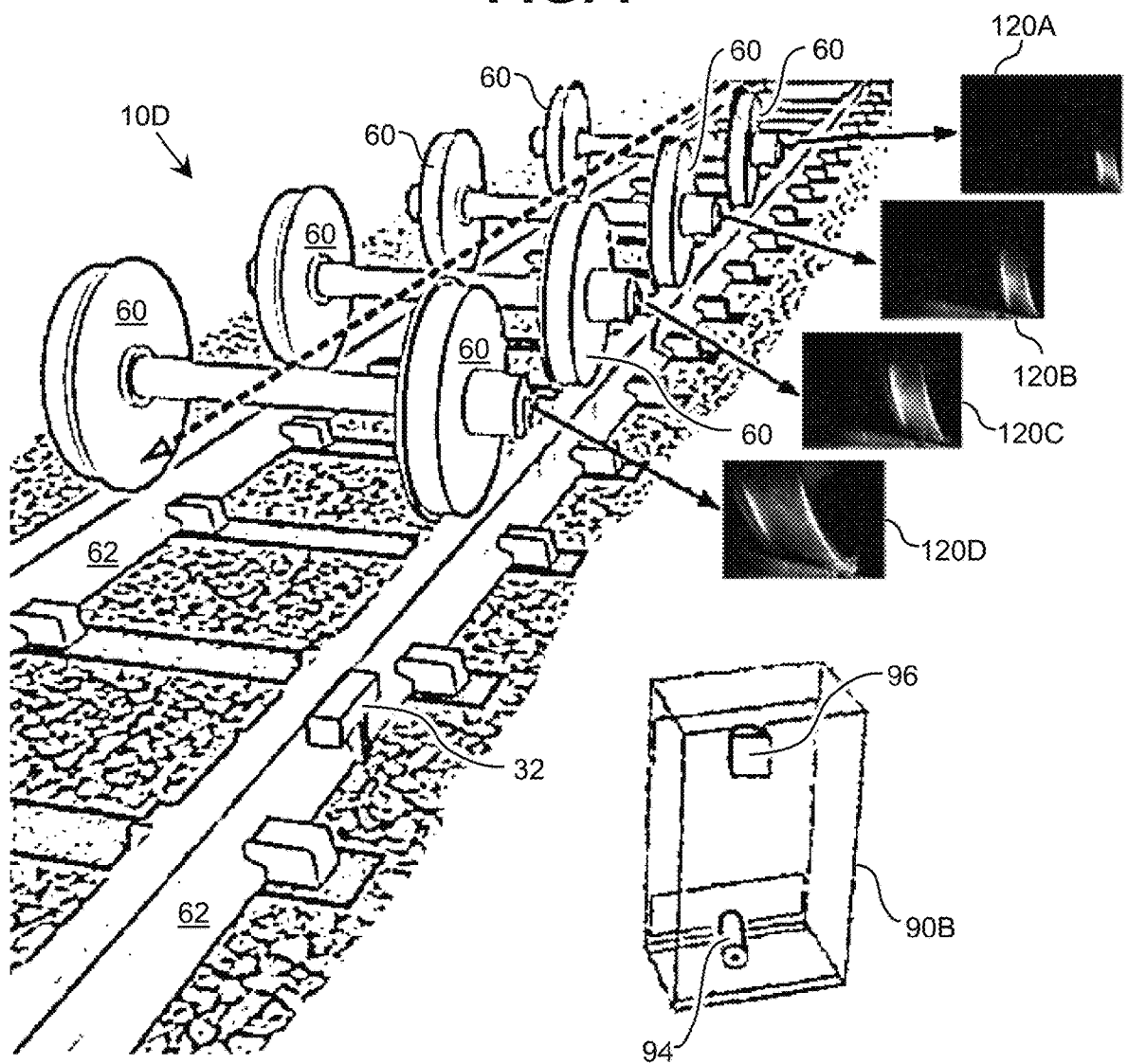
FIG. 7 shows detection of wheel in the images acquired by an imaging device in an illustrative environment according to in an embodiment.

When rail wheel 60 (FIG. 2) is present, measurement module 44 can extract a portion of wheel 60 from each of a plurality of images of rail wheel 60. For example, FIG. 7 shows detection of wheel 60 in the images 120A-D acquired by an imaging device 96 in an illustrative environment 10D according to in an embodiment. In FIG. 7, images 120A-D show various illustrative locations at which rail wheel 60 may be imaged by the imaging device 96. As illustrated, the imaging device 96 can be oriented to acquire image data at a relatively small angle with respect to the path of travel for the rail wheel 60. In an embodiment, the angle is less than forty-five degrees. Using calibration data, measurement module 44 can locate the boundaries of the portion of wheel 60 present in each image 120A-D. Using standard image processing techniques, for each rail wheel image 120A-D, measurement module 44 can extract features in wheel portion 60 from the image data.

Figure 8A:
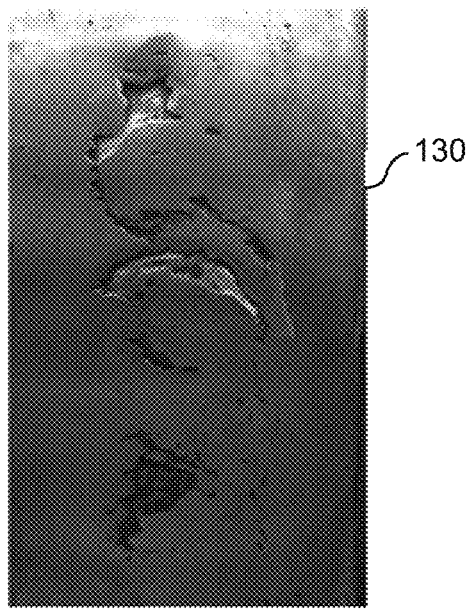
FIGS. 8A-8C show detection of features in an image of a wheel according to an embodiment.
Figure 8B:
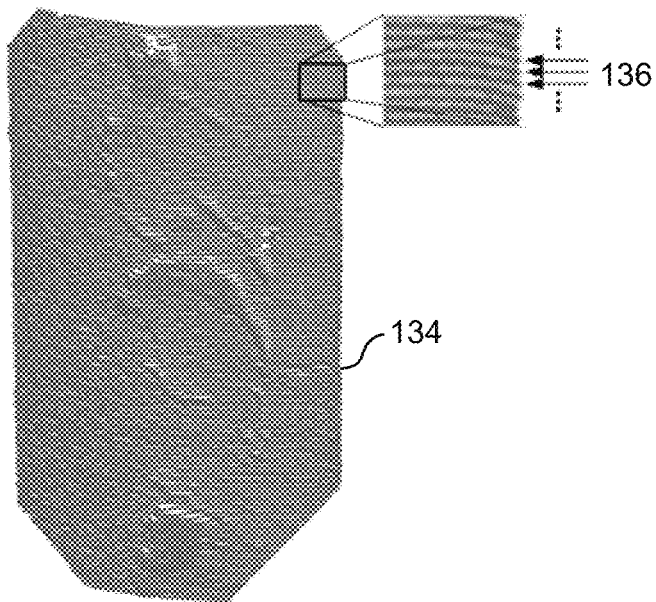
Figure 8C:
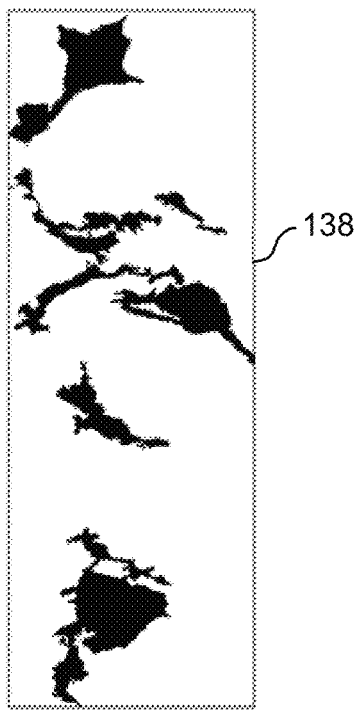

With regards to FIGS. 8A-8C, the process is illustrated whereby desired features in wheel 60 are isolated from wheel data 50 using image processing operations known to those skilled in the art. More particularly, FIG. 8A depicts an image 130 of a wheel 60 with defects that are desired to be measured. FIG. 8B shows an image 134, which is the result of 3D scans of the wheel 60 by an imaging device according to an embodiment. The individual scans 136, shown in an exploded view of a region of the image 134, can correspond to a collection of lines of light 102 shown and described in conjunction with FIG. 5, which can be generated on the wheel 60 as it moves along the rail 62. The 3D information developed for each point on wheel 60 that is contained in lines 102 projected onto the wheel 60 by an illuminator 94 can be used in further image processing. FIG. 8C shows a processed image 138, which depicts features extracted from the image 130 and/or the 3D data of the image 134 by 3D image processing operations known to those skilled in the art. The processed image 138 can be stored as wheel data 40 for the wheel 60. Returning to FIG. 1, defect module 46 can determine whether one or more defects are present in the wheel based on wheel data 50 and/or the measured features.

Figure 9:
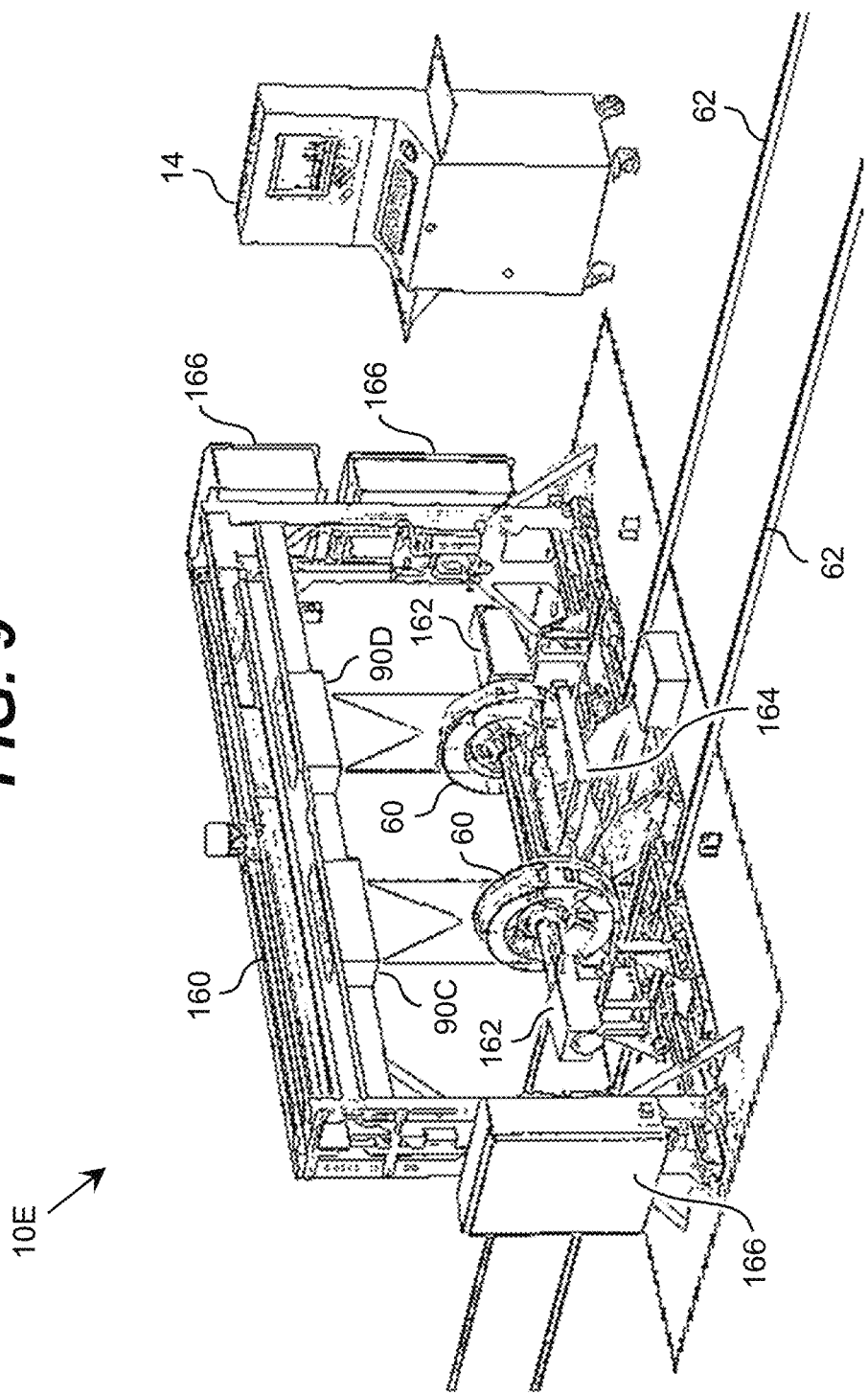
FIG. 9 shows an alternate embodiment showing the system as deployed in a wheel repair shop.

With regard to FIG. 9, an alternative embodiment of an environment 10E is shown in which the wheel 60 is not imaged as it moves along a rail 62, but is instead held and rotated in a stationary position. FIG. 9 illustrates such an embodiment as might be seen in a wheel shop. A support structure 160 positions the enclosures 90C, 90D, each of which can contain the illuminators and cameras described herein at appropriate locations over a set of rails 62 running through the wheel shop. Wheels 60 passing along rails 62 will be caught and lifted by mechanisms 162 and assisted by jack and support structure 164.

Mechanisms 162 include a capability to apply force to the wheels 60 in order to cause them to rotate. This rotation allows the entire surface of the wheel 60 to be imaged using the illumination devices 94 and cameras 96 as described herein. For example, when one or more lines of light are directed at the wheel to form a cord on side surface of the wheel, the chord will be located a substantially constant distance from a center of the wheel. Changes in a height of the chord can be indicative of one or more defects in the wheel. When illuminated with diffuse radiation, the illumination devices 94 and cameras 96 can be oriented to acquire image data corresponding to the edges of the illuminated portions of the wheel, which are only grazed by the radiation, resulting in enhanced shadow data.

The jack and support structure 164 assists both in lift and in providing a safety against the wheel, which is very heavy, dropping from the grip of mechanisms 162. The operations of the systems in enclosures 90, the mechanisms 162, and the jack and support structure 164, may be directed and powered through appropriate systems in enclosures 166.

As discussed herein, data collected from the wheels 60 can be provided to computing device 14 for storage and/or further processing. After inspection, the wheels 60 are returned to the rails 62 and may be routed to a car for use, or to a truing station for repair/re-truing, or if fatal faults are found can be routed to a disposal area. In this environment 10E, both wheel defects and wheel measurements may be required at various times in the process of restoring a damaged wheel to operational state. Illuminators and imaging devices can be disposed with respect to wheel 60 in any of the configurations previously shown in FIGS. 4A-7.

It is understood that the various embodiments described and other variations that are obvious to those skilled in the art can be advantageously combined to develop a more comprehensive identification and measurement of defects in rail wheel 60. For example, the horizontal and vertical line laser illumination and the diffuse illumination can employed in any combination. Further variations, such as projection of the horizontal lines described in FIG. 4A, can be altered to project the lines at some angle with respect to horizontal to improve the detection of fine details required in some applications.

Regardless, when defect module 46 (FIG. 1) detects the presence of one or more defects in rail wheel 60, status module 48 (FIG. 1) can determine an operational status of rail wheel 60, e.g., whether rail wheel 60 is safe for continued operation. To this extent, status module 48 can determine a size/severity of the defect and compare the size/severity to a level that is acceptable for continued operation of rail wheel 60. When the defect exceeds an acceptable level, status module 48 can indicate that rail wheel 60 is unsafe for continued operation. Further, when the defect is within an acceptable, but high range, status module 48 can generate a warning regarding the use of rail wheel 60 and an additional inspection, manual (e.g., visual) or computer-assisted, can be made to ensure that rail wheel 60 continues to be safe for continued operation.

It is understood that the embodiments described in regard to FIGS. 4A-7 can be advantageously combined in any combination to fulfill the objectives of a particular application.

While shown and described herein as a method and system for measuring a wheel, it is understood that the invention further provides various alternative embodiments. For example, in one embodiment, the invention provides a computer-readable medium that includes computer program code to enable a computer infrastructure to evaluate a wheel. To this extent, the computer-readable medium includes program code, such as processing program 40 (FIG. 1), which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or the like.

In another embodiment, the invention provides a method of generating a system for evaluating a wheel. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as installing processing program 40 (FIG. 1) on computing device 14 (FIG. 1), from a computer-readable medium; (2) adding one or more computing devices to the computer infrastructure, such as one or more of the devices in capture system 30 (FIG. 1); and (3) incorporating and/or modifying one or more existing systems of the computer infrastructure, to enable the computer infrastructure to perform the process steps of an embodiment of the invention.

In still another embodiment, the invention provides a business method that performs the process steps of the invention on a subscription, advertising, and/or fee basis. That is, a service provider could offer to evaluate a wheel as described above. In this case, the service provider can manage (e.g., create, maintain, support, etc.) a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising space to one or more third parties.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof. Still further, the term "substantially" means within a margin of error defined by the physical limits of the implementation. In an embodiment, "substantially" means within +/−one percent.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of evaluating a wheel, the method comprising:
    illuminating an area in which a wheel is rotating, wherein the illuminating comprises emitting at least one sheet of light substantially parallel to a surface of a path on which the wheel is moving, wherein each sheet of light is configured to intersect a side surface of the wheel forming a chord on the side surface and intersect a tread surface of the wheel located on at least one side of the chord, wherein the chord forms a segment on the side surface of the wheel having a substantially constant height above the path as the wheel moves along the path;
    obtaining image data for the wheel as the wheel moves along the path, wherein the image data includes a plurality of images acquired at distinct times when the wheel is located within the area, wherein the plurality of images include a plurality of images including the chord and an area of the tread surface of the wheel intersected by the at least one sheet of light; and evaluating the tread surface of the wheel based on at least the image data including the area of the tread surface of the wheel intersected by the at least one sheet of light.

2. The method of claim 1, further comprising evaluating the side surface of the wheel based on the image data.

3. The method of claim 1, wherein the illuminated area has a length of at least one circumference of the wheel.

4. The method of claim 1, wherein the evaluating includes evaluating a length of the chord.

5. The method of claim 1, wherein the image data is acquired by at least one imaging device oriented at an angle less than forty-five degrees with respect to a path through which the wheel is moving.

6. The method of claim 1, wherein the plurality of images including the area of the tread surface of the wheel intersected by at least one of the set of lines of light includes image data for substantially an entire circumference of the tread surface of the wheel.

7. The method of claim 6, wherein the image data for the wheel is obtained from multiple passes of the wheel along a path.

8. The method of claim 1, further comprising illuminating the tread surface of the wheel with diffuse radiation, wherein the imaging includes acquiring image data including a portion of the tread surface grazed by the diffuse radiation.

9. A system for evaluating a wheel, the system comprising:
   a set of illumination devices configured to illuminate an area in which a wheel is rotating, wherein the set of illumination devices emit at least one sheet of light substantially parallel to a surface of a path on which the wheel is moving, wherein the at least one sheet of light is configured to intersect a side surface of the wheel forming a chord on the side surface and intersect a tread surface of the wheel located on at least one side of the chord, wherein the chord forms a segment on the side surface of the wheel having a substantially constant height above the path as the wheel moves along the path;
   a set of imaging devices configured to acquire image data for the wheel as the wheel moves along the path, wherein the image data includes a plurality of images acquired at distinct times when the wheel is located within the area, wherein the plurality of images include a plurality of images including the chord and an area of the tread surface of the wheel intersected by the at least one sheet of light; and
   means for evaluating the tread surface of the wheel based on at least the image data including the area of the tread surface of the wheel intersected by the at least one sheet of light.

10. The system of claim 9, further comprising means for evaluating the side surface of the wheel based on the image data.

11. The system of claim 9, wherein the path has a length of at least one circumference of the wheel.

12. The system of claim 9, wherein the evaluating includes evaluating a length of the chord.

13. The system of claim 9, wherein the set of imaging devices are oriented at an angle less than forty-five degrees with respect to a path through which the wheel is moving.

14. The system of claim 9, wherein the plurality of images including the area of the tread surface of the wheel intersected by at least one of the set of lines of light includes image data for substantially an entire circumference of the tread surface of the wheel acquired during a single pass of the wheel through the area.

15. The system of claim 9, further comprising a second set of illumination devices configured to illuminate the tread surface of the wheel with diffuse radiation, wherein the set of imaging devices acquire image data including a portion of the tread surface grazed by the diffuse radiation.

16. A system for evaluating a wheel, the system comprising:
   a first set of illumination devices configured to illuminate at least a tread surface of the wheel with diffuse radiation;
   a set of imaging devices configured to acquire image data for the wheel as the wheel rotates, wherein the image data includes a plurality of images acquired at distinct times when the wheel is located within the area, wherein the set of imaging devices acquire image data including a portion of the tread surface grazed by the diffuse radiation; and
   means for evaluating the tread surface of the wheel based on at least the image data including the portion of the tread surface grazed by the diffuse radiation.

17. The system of claim 16, wherein the set of imaging devices are oriented at an angle less than forty-five degrees with respect to a path through which the wheel is moving.

18. The system of claim 16, further comprising a second set of illumination devices configured to emit at least one sheet of light configured to intersect a tread surface of the wheel as the wheel rotates, wherein a height of the intersection with the tread surface is located at least one of: a substantially constant distance from a center of the wheel as the wheel rotates or a substantially constant height above a path of travel for the wheel.

19. The system of claim 18, wherein the at least one sheet of light further intersects a side surface of the wheel forming a chord on the side surface, wherein the image data further includes the chord and wherein the evaluating includes evaluating the tread surface based on the chord.

20. The system of claim 19, further comprising evaluating the side surface of the wheel based on the image data.

* * * * *